United States Patent [19]

Stein

[11] Patent Number: 5,601,297
[45] Date of Patent: Feb. 11, 1997

[54] UNIVERSAL INFANT CARRIER CART

[76] Inventor: Linda P. Stein, 14 Jackman Ridge, Windham, N.H. 03087

[21] Appl. No.: 369,587

[22] Filed: Dec. 20, 1994

[51] Int. Cl.$^6$ ........................................... B62B 7/12
[52] U.S. Cl. .................. 280/30; 280/658; 280/47.4; 188/20; 297/252
[58] Field of Search ..................... 280/30, 31, 643, 280/642, 647, 648, 650, 657, 658, 47.38, 47.39, 47.4, 47.41, 33.993, 33.994, 79.2; 188/20; 297/252, 256.16, 250.1

[56] References Cited

U.S. PATENT DOCUMENTS

| | | | |
|---|---|---|---|
| 4,537,414 | 8/1985 | Nusbaum | 280/47.41 |
| 4,768,795 | 9/1988 | Mar | 280/30 |
| 4,822,064 | 4/1989 | Hunter | 280/30 |
| 4,930,697 | 6/1990 | Takahashi et al. | 280/47.38 |
| 5,028,061 | 7/1991 | Hawkes | 280/47.4 |
| 5,104,134 | 4/1992 | Cone | 280/30 |
| 5,121,940 | 6/1992 | March | 280/644 |
| 5,133,567 | 7/1992 | Owens | 280/30 |
| 5,201,535 | 4/1993 | Kato et al. | 280/30 |
| 5,234,224 | 8/1993 | Kim | 280/30 |
| 5,499,831 | 3/1996 | Worth et al. | 280/30 |

FOREIGN PATENT DOCUMENTS

| | | | |
|---|---|---|---|
| 1458082 | 11/1966 | France | 280/33.994 |
| 2254587 | 10/1992 | United Kingdom | 280/130 |
| 92021544 | 12/1992 | WIPO | 280/30 |

*Primary Examiner*—Anne Marie Boehler
*Attorney, Agent, or Firm*—Hinkle & Associates, P.C.

[57] ABSTRACT

An adjustable, clamping infant carrier support frame that can be used as part of a stroller to provide for quick clamping of infant carriers of different shapes and sizes. The clamping infant carrier support frame comprises a clamping support frame with openings for the insertion of mechanical clamps. The clamps adjust to the size of the infant carrier and apply a securing force through a clamp disk. The frame may also include an interconnected braking mechanism which operates automatically when the clamps are closed.

20 Claims, 5 Drawing Sheets

Fig_1

Fig_2

Fig_3

Fig_4

FIG_5

FIG_6

FIG_8

FIG_9

Fig_7

UNIVERSAL INFANT CARRIER CART

BACKGROUND OF THE INVENTION

I. Field of the Invention

The present invention relates generally to the field of strollers, and more particularly to strollers that can be used to transport infant carriers of varying shapes and sizes.

II. Description of the Prior Art

In order to protect infants in the event of an automobile accident, there has been an increase in the use of protective car seats, and in many states the use of protective car seats is required by law. A stroller which can transport a car seat eliminates the need for removing the infant from the car seat and placing them into a different seat in the stroller. With this type of stroller, the infant may be transferred from car to stroller with a minimum amount of disruption. Also, this type of stroller requires less storage space than the alternative of having a stroller with a built in seat and having a separate protective car seat.

The prior art contains many car seat/stroller combinations. Most of the combinations are proprietary with respect to the particular car seat that they utilize. Some of the various designs include integral car seat/stroller combinations. U.S. Pat. No. 4,537,414 issued to Nusbaum, discloses a self contained car seat/stroller Combination. The unit converts from a car seat to a stroller by means of a retractable handle and a retractable base with wheels. This unit eliminates the need for a separate stroller, but does not offer a solution for someone that already has a protective car seat and wants to be able to continue to use the car seat, both in the car and in a stroller.

U.S. Pat. No. 5,135,567 issued to Owens discloses a combination car seat and stroller that includes an infant carrier which can be converted into a protective car seat or a stroller depending on the use of attachments. For use as a car seat, the infant carrier is attached to a base which can be secured in the car with a safety belt. By attaching a stroller handle assembly and a stroller wheel assembly to the base, the infant carrier is transformed into a stroller. This device approaches the problem from a modular approach as opposed to the integral approach of Nusbaum, but the base in the Owens patent can only accommodate the specific infant carrier for which it was designed. Thus, an existing car seat could not be used in the system without modification.

U.S. Pat. No. 5,1217940 to March discloses an umbrella type collapsible stroller frame which is adapted to carry infant carriers of varying dimensions. The collapsible stroller frame has a sling and straps which allow the stroller to support a variety of different sized infant carriers. At the front, lower end of the stroller frame a support member holds a sling. The front portion of the support member and the sling element accommodate the front of the infant carrier, and the back of the infant carrier is supported by straps which span the space between the frame rails. The infant carrier can be further secured to the stroller frame by the use of additional straps which can be attached to the handle or body portion of the infant carrier.

SUMMARY OF THE INVENTION

The present invention is a clamping infant carrier support frame which enables a stroller to transport car seats of varying dimensions. The clamping infant carrier support frame comprises a clamping support frame which has openings for the insertion of mechanical clamps. The clamps have a clamp body, which has an opening down the center, which fits and engages with the inner surface of the opening in the clamping support frame. The force of the clamp is actuated by either a clamp screw or a cam operator with an actuator stem. The actuating element is positioned inside the clamp body. The clamping force is transmitted through a clamp disk with grips on the front side which is activated by its back side being juxtaposed with the actuating element. The clamp may or may not be additionally comprised of an actuator rod which attaches to the clamp disk on one side and juxtaposes with the actuating element on the other side.

The clamping support frame may have a round opening for accepting the clamp body which may be cylindrical in shape. With the clamp screw as the actuating element, the cylindrical clamp body may have a counterbore at one end to house the actuator rod and a return spring. The return spring applies a force to a piston on the actuator rod and causes the retraction of the actuator rod and the clamp disk. The counterbore may be covered at the open end by a retaining nut which holds the return spring and the actuator rod in the counterbore.

The clamping support frame may be tapped, and the clamp body may have a screw thread on its outer surface. In this manner, the clamp body can be adjustably engaged in the clamping support frame by the threaded interface. In order to fix the position of the clamp body relative to the clamping support frame, a locking nut may be positioned on the outside of the clamp body.

With the cam operator and actuator stem as the actuating element, the clamping infant carrier support frame may comprise the clamp body having an opening down the center from one end to the other and a counterbore extending inside a portion of the clamp body. The actuator stem may extend longitudinally inside the opening in the clamp body and be connected to the cam operator on one end and the clamp disk and grips on the other. In this manner, the cam operator allows for longitudinal movement of the actuator stem inside the clamp body. The clamping spring, which is located in the counterbore of the clamp body, exerts the clamping force against a piston on the actuator rod. The counterbore may be bounded on the end by a retaining nut which holds the piston on the actuator rod in the counterbore.

The clamping infant carrier support frame may be interconnected to a brake mechanism which automatically engages a brake on the wheels of the stroller according to the clamping force on the infant carrier. The interconnected brake mechanism comprises a sensing spring which fits inside the clamp body between the actuator rod and the clamp screw and detects the relative distance between the two. A position sensor, which may be connected to the sensing spring, moves longitudinally inside a brake cable and triggers a brake actuator to release the brake by removing a plunger from the teeth of a brake gear wheel if the clamping force is sensed.

Also, the brake mechanism may comprise a sensing bellows located between an inner and outer actuator disk, a brake actuator air line, and a brake actuator. When the clamping force is applied, the inner and outer actuator disks are moved closer together increasing the pressure on the sensing bellows. In reaction to the increased pressure, air leaves the sensing bellows and travels through the air line to the brake actuator to release the brake from the stroller wheel.

Accordingly, it is an object of the invention to provide an improved infant carrier support frame which clamps on an infant carrier quickly and securely.

A further object of the present invention is to provide an infant carrier support frame, as aforesaid; which can be used with a variety of existing infant carriers of differing shapes and sizes.

A further object of the present invention is to provide an infant carrier support frame, as aforesaid, which interconnects automatically with a brake on a stroller wheel A further object of the present invention is to provide an infant carrier support frame, as aforesaid, which is stable, safe and easily maneuverable.

A further object of the present invention is to provide an infant carrier support frame, as aforesaid, which is relatively simple and inexpensive to manufacture and assemble, Other objects, advantages and capabilities of the invention will become apparent from the following description taken in conjunction with the accompanying drawings showing preferred embodiments of the invention.

DESCRIPTION OF THE PREFERRED EMBODIMENTS

Figure 1:
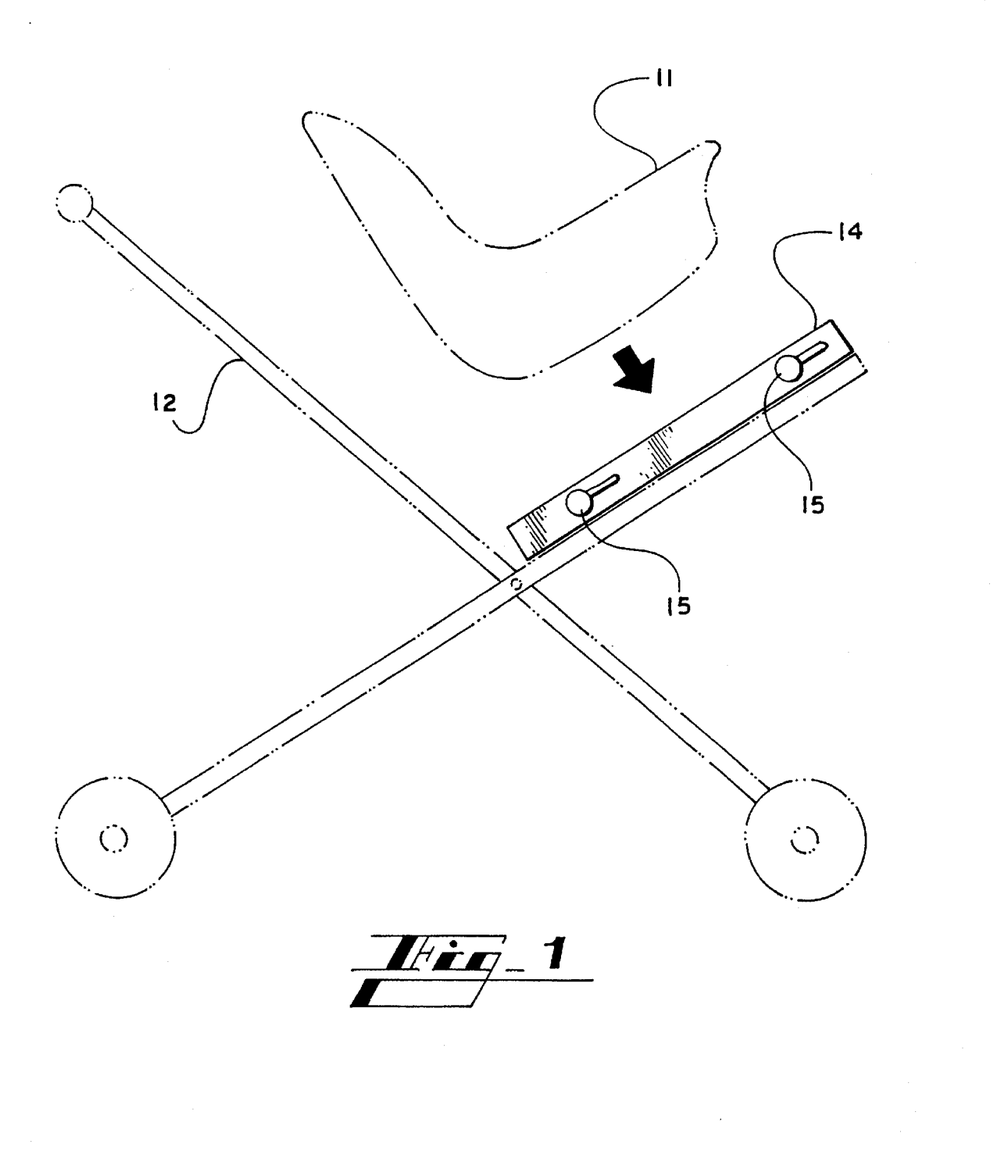
FIG. 1 is a side elevation view of the clamping infant carrier support frame with an infant carrier and a stroller.

Referring to the drawings wherein like reference numerals designate corresponding parts throughout the several figures, FIG. 1 illustrates in a side elevation view the clamping support frame 14 of the present invention. The clamping support frame 14 permits a stroller 12 to support an infant carrier 11 which can be of differing sizes and dimensions. The mechanical clamp 13 (shown in FIG. 2) fits into the opening 15 and holds the infant carrier 11 securely in position for transport by means of the stroller 12.

Figure 2:
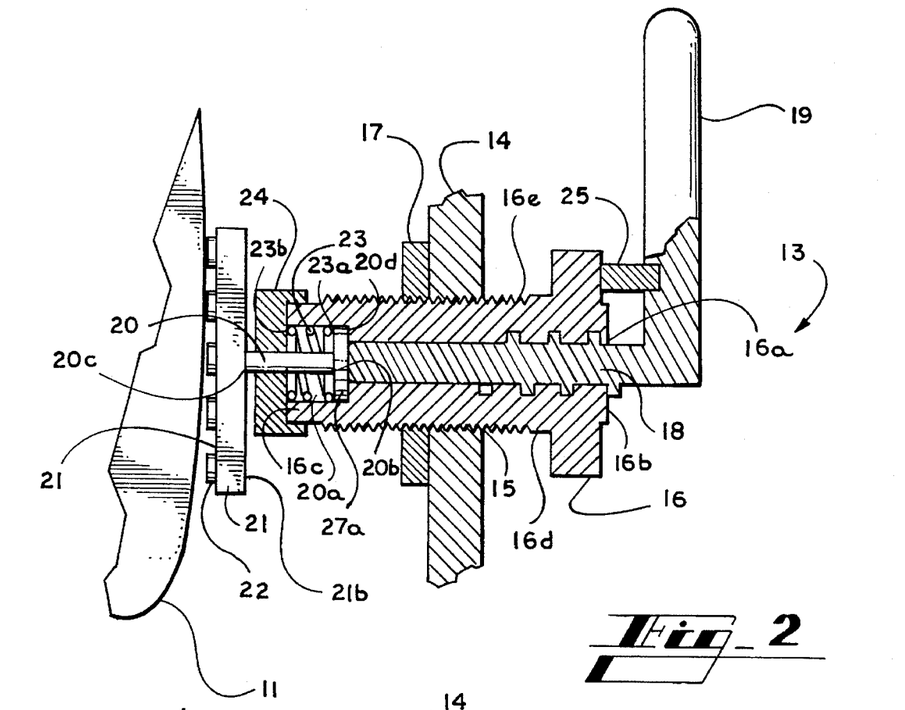
FIG. 2 is a cut away front view of the clamping support frame and a mechanical clamp.

Reference is now made to FIG. 2 which illustrates one embodiment of the mechanical clamp in a cut away front view. The clamp body 16 has threads 16e on the outer surface 16d which allow it to engage with the inner surface in the opening 15 in the clamping support frame 14. The opening 15 may be round and may be tapped. After the clamp body 16 is adjusted to the proper position in the clamping support frame 14, the locking nut 17 is used to fix the position of the clamp body 16 relative to the clamping support frame 14. The clamp body 16, which may be cylindrical, has an opening 16a down the center which may be round and tapped, and accepts a clamp screw 18. The clamp screw 18, which may be cylindrical, actuates the clamping force and is turned by the handle 19. In order to prevent the clamp screw 18 from being advanced too far in the longitudinal direction, the handle 19 has a stop 25 which prevents the handle 19 from being advanced beyond a predetermined point at the first end 16b of the clamp body. The end of the clamp screw 18 opposite the handle 19 directly contacts and applies a longitudinal force to an actuator rod 20. The actuator rod 20 is seated in a counterbore 20a in the second end 16c of the clamp body 16. The actuator rod 20 has a first end 20b and a second end 20c. The first end 20b juxtaposes with the clamp screw 18 and, the second end 20c connects to the clamp disk 21. The actuator rod 20 may have a piston 27a at the first end. A return spring 23 is positioned in the counterbore 20a between the piston 27a on the actuator rod and a retaining nut 24 at the second end 16c of the clamp body. The retaining nut 24 holds the return spring 23 and the actuator rod 20 in the counterbore. The actuator rod 20 is connected to a clamp disk 21 which has grips 22 for gripping the infant carrier 11. When used to hold an infant carrier 11, the clamp screw 18 comprises the actuator means and applies a force to the actuator rod 20 which is connected to the clamp disk 21. The clamp disk has a front side 21a with grips 22 on it and a back side 21b which is connected to the actuator rod 20. The force transmitted from the clamp screw 18 to the actuator rod 20 and consequently to the grips 22 holds the infant carrier 11 securely in the stroller 12 (shown in FIG. 1). When the direction of rotation of the handle 19 is reversed in order to retract the clamp screw 18, the return spring 23 applies a force to the piston 27a on the actuator rod 20 and causes the retraction of the actuator rod 20 and the clamp disk 21. The return spring 23 has a first end 23a and a second end 23b. The first end juxtaposes with the piston 27a on the actuator rod 20 and the second end juxtaposes with the retaining nut 24.

Figure 3:
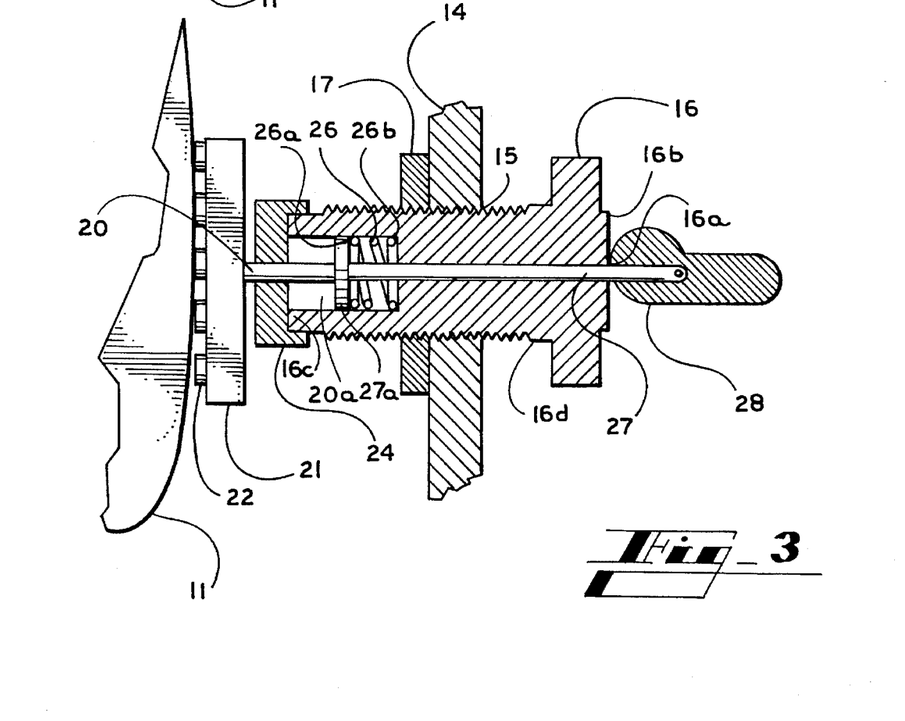
FIG. 3 is a cut away front view of the clamping support frame and an alternate embodiment of the mechanical clamp.

FIG. 3 illustrates a second embodiment of the mechanical clamp in a cut away front view. This embodiment illustrates the mechanical clamp with an alternative actuator means instead of the clamp screw 18. The cam operator 28 and the actuator stem 27 may be substituted for the clamp screw 18 in order to comprise the actuator means. Also, the actuator stem may be fixedly connected to the actuator rod 20 at the piston 27a.

The clamp body 16 may be threaded on the outer surface 16d in order to fit into the threaded opening 15 in the clamping support frame 14. The locking nut 17 locks the position of the clamp body 16 relative to the clamping support frame 14. The clamp body 16 has a counterbore 20a at one end and a longitudinal opening 16a starting at the opposite end. The opening 16a, which may be round, is sized to fit an actuator stem 27 which is connected to the piston 27a. The actuator stem 27 moves longitudinally inside the clamp body 16 by means of a cam operator 28 located at the first end 16b of the clamp body 16. At the second end 16c of the clamp body 16, a counterbore 20a in the clamp body houses the piston 27a, which is attached to the actuator stem 27, and a clamp spring 26. The clamping force of clamp disk 21 and grips 22 on infant carrier 11 is provided by clamp spring 26 acting on the piston 27a on the actuator rod 20. The clamping spring 26 has a first end 26a and a second end 26b. The first end being juxtaposed with the piston 27a on the actuator rod 20 and the second end being juxtaposed with the closed end 20d of the counterbore 20a. The piston 27a and the clamp spring 26 are held in the counterbore 20a by the retaining nut 24.

Figure 4:
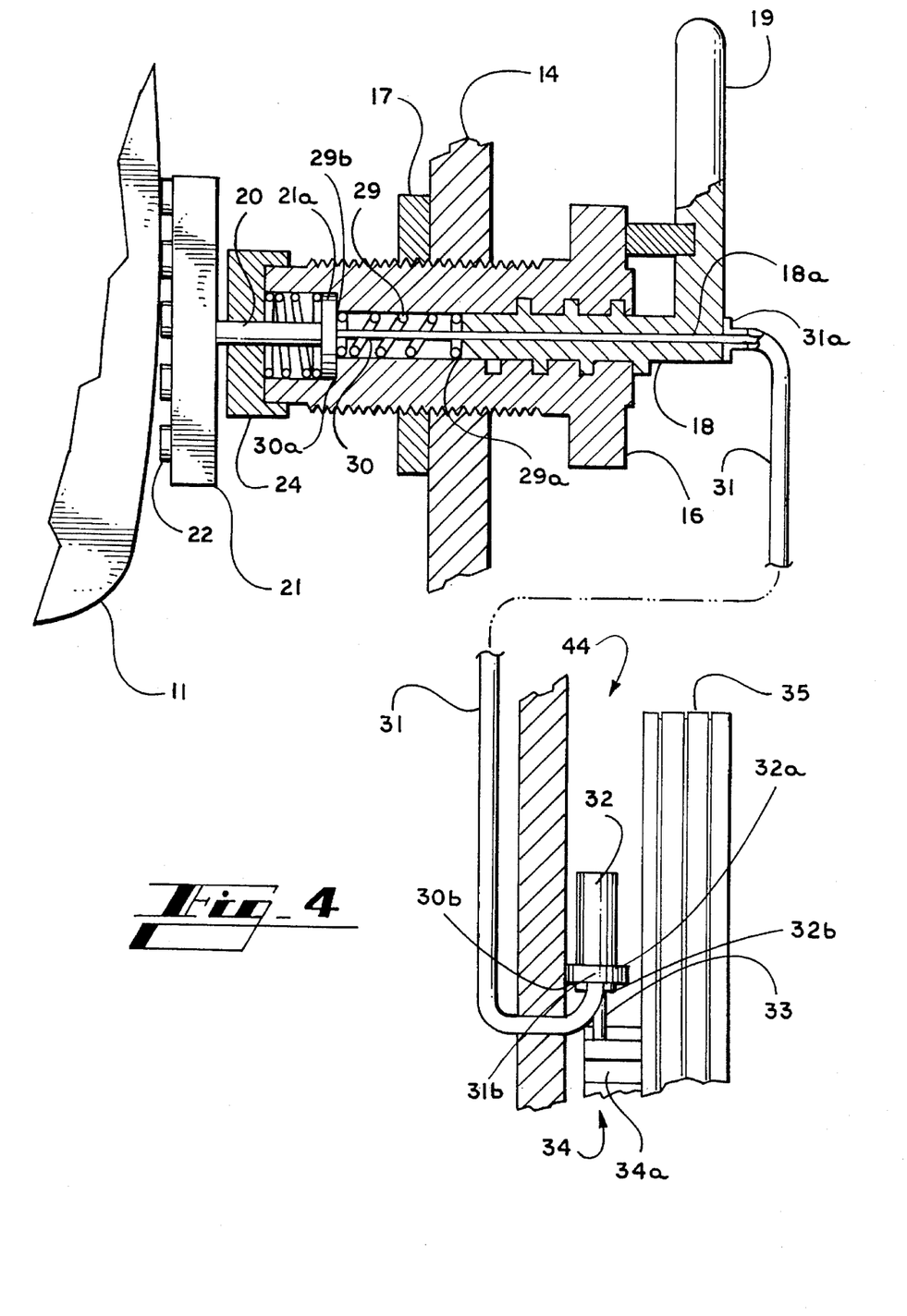
FIG. 4 is a cut away front view of the clamping support frame and a mechanical clamp with an interconnected safety brake mechanism.

FIG. 4 illustrates a cut away front view of the clamping support frame and a mechanical clamp with an interconnected safety brake mechanism. The clamping force of clamp disk 21 and grips 22 on infant carrier 11 is provided by rotation of the clamp screw 18 by handle 19. The clamp screw 18 has an opening 18a down the center. The clamp screw 18 provides a longitudinal force against the sensing spring 29 which transmits the force to the actuator rod 20. The actuator rod 20 transmits the force through the clamp disk 21 to the grips 22 which hold the infant carrier 11 in place. The relative position between the clamp screw 18 and the actuator rod 20 is sensed by sensing spring 29. The sensing spring has a first end 29a and a second end 29b. The first end being juxtaposed with the actuator means and the second end being juxtaposed with the actuator rod 20 or the piston 27a. This relative position provides a mechanical indication of the clamping force applied to the infant carrier 11. The relative position is transmitted to the input 32a of the brake actuator 32 on the brake 44 by a position sensor 30 which is housed in a brake cable 31. The position sensor 30 has a proximal end 30a and a distal end 30b and moves inside the brake cable 31 in response to the compression of the sensing spring 29. The proximal end 30a is attached to the sensing spring 29 and the distal end is attached at the input 32a of the brake actuator 32. The brake cable 31 also has a proximal end 31a and a distal end 31b. The proximal end 31a of the brake cable 31 is connected to the opening 18a in the clamp screw 18. At the distal end 31b, the brake cable 31 is connected to the input 32a of the brake actuator 32. The position sensor 30 activates the brake actuator 32. In this manner, the brake is automatically controlled by whether the clamping force is detected. If the clamping force is detected, position sensor 30 causes the brake actuator 32 to disengage the brake plunger 33, which is controlled at the output 32b of the brake actuator 32, from the brake gear wheel 34. When the clamping force is not applied, the position sensor 30 does not interact with the brake actuator 32 and the brake is engaged.

Figures 5, 6, 8, 9:
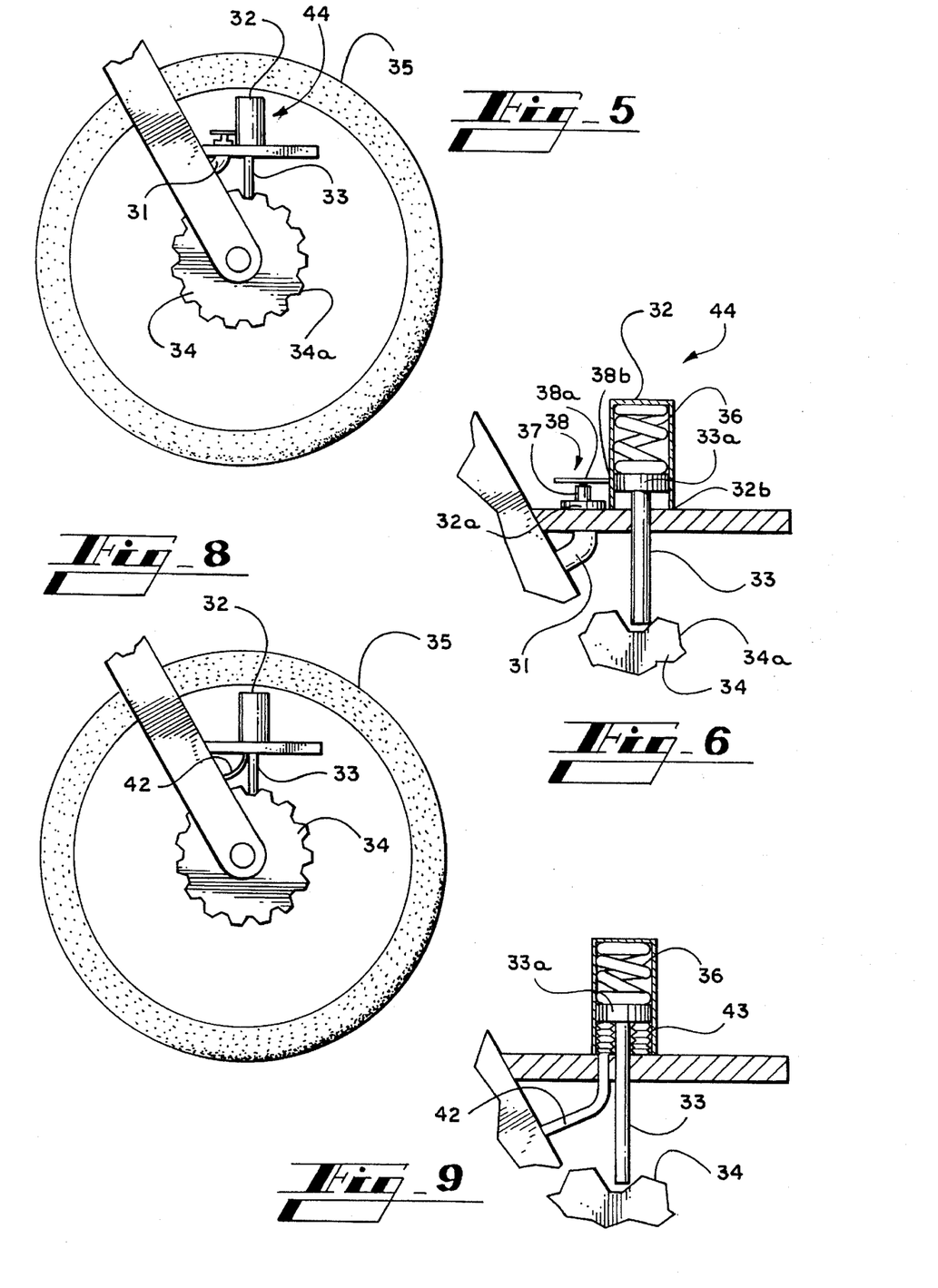
FIG. 5 is a side elevation view of a stroller wheel equipped with the safety brake mechanism of FIG. 4.
FIG. 6 is a detailed, cut away side elevation view of the safety brake mechanism of FIG. 5.
FIG. 8 is a side elevation view of a stroller wheel equipped with the safety brake mechanism of FIG. 7.
FIG. 9 is a detailed, cut away side elevation view of the safety brake mechanism of FIG. 8.

FIG. 5 illustrates a side elevation view of a stroller wheel equipped with the safety brake mechanism of FIG. 4. The wheel 35 has a brake gear wheel 34. When the clamping force is not sensed by the sensing spring 29 and position sensor 30, the brake plunger 33 rests in the teeth 34a of the brake gear wheel 34 preventing the rotation of wheel 35.

FIG. 6 illustrates a detailed, cut away side elevation view of the safety brake mechanism of FIG. 5. The brake actuator 32, which may have a cylindrical body, houses the elements of the brake 44. The brake cable 31 houses the position sensor 30. When the clamping force is detected by the sensing spring 29, the position sensor 30 moves longitudinally through the brake cable and applies an upward force to the plunger lever 38 through the brake pin 37. The plunger lever 38 has a first end 38a and a second end 38b. The first end is attached to the position sensor 30 and the second end 38b is connected to the brake plunger 33. When the upward force is applied to the plunger lever 38, the brake plunger 33 is retracted from the teeth 34a of the brake gear wheel 34. The brake spring 36 provides a downward force on the piston 33a of the brake plunger 33 to maintain the brake 44 in the engaged position when the clamping force is not applied to the infant carrier 11.

Figure 7:
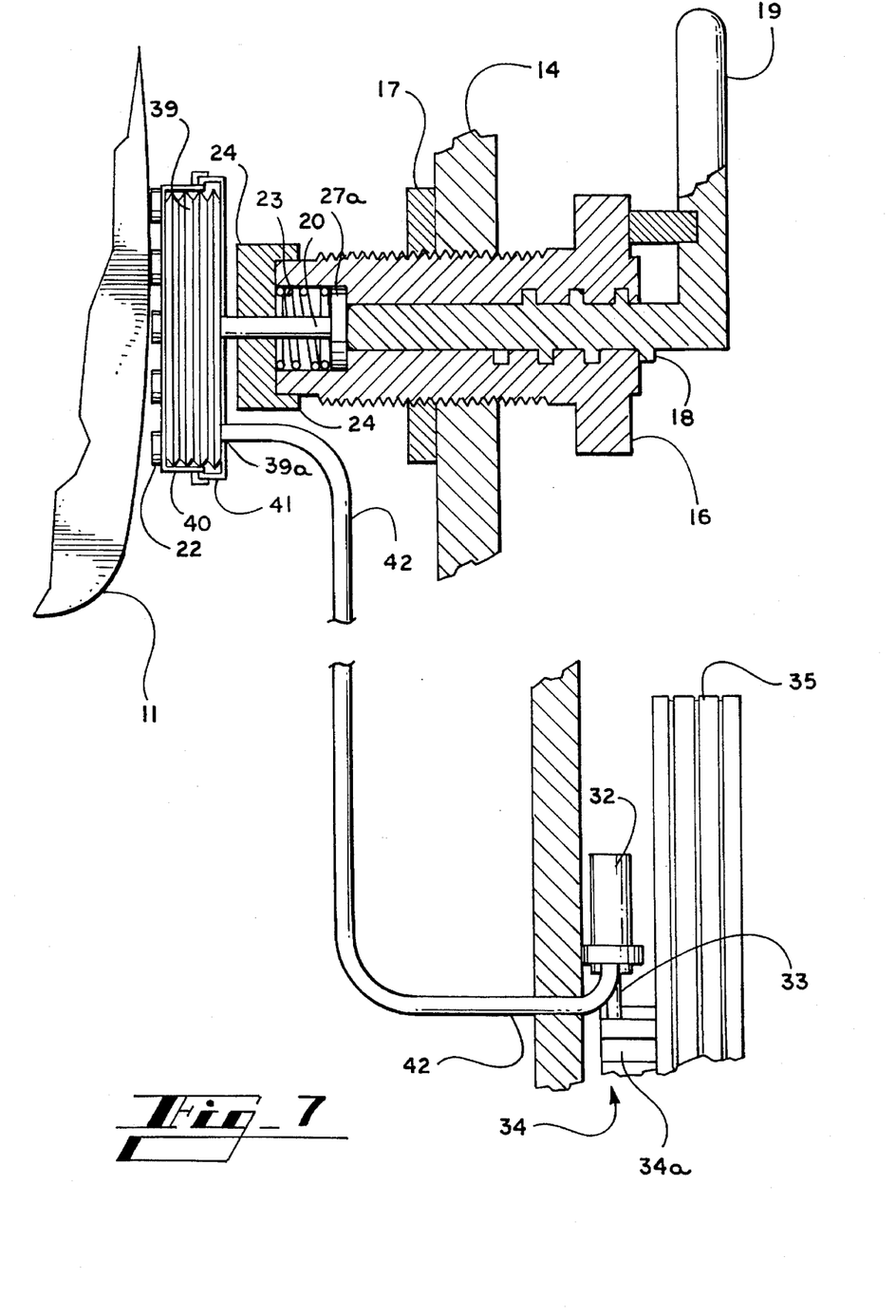
FIG. 7 is a cut away front view of the clamping support frame and a mechanical clamp with an alternate embodiment of the interconnected safety brake mechanism.

FIG. 7 illustrates a cut away front view of the clamping support frame and a mechanical clamp with an alternative embodiment of the interconnected safety brake mechanism. The clamping force of outer actuator disk 40 and grips 22 on infant carrier 11 is provided by rotation of the clamp screw 18 by the handle 19. The rotation of the clamp screw 18 produces a force on actuator rod 20 which is transmitted to the outer actuator disk 40 and the grips 22. The relative distance between the inner actuator disk 41 and the outer actuator disk 40 produces a pressure in the sensing bellows 39. When the clamping force is applied, the inner and outer actuator disks are moved closer together and the pressure increases inside the sensing bellows 39. The pressure is relieved by air escaping from the outlet 39a of the bellows through the brake actuator air line 42. The air flowing from the sensing bellows 39 travels through the brake actuator air line 42 to the brake actuator 32, and causes the brake actuator 32 to raise the brake plunger 33 from the brake gear wheel 34. In this manner, the brake is automatically disengaged when the clamping force is detected.

FIG. 8 illustrates a side elevation view of a stroller wheel equipped with the safety brake mechanism of FIG. 7. The wheel 35 is equipped with a brake gear wheel 34. When the clamping force is not sensed by the sensing bellows 39, the brake plunger 33 rests in the teeth of the brake gear wheel 34 preventing the rotation of the wheel 35.

Reference is now made to FIG. 9 which illustrates a detailed, cut away, side elevation view of the Safety brake mechanism of FIG. 8. The brake actuator air line 42 is connected to the brake bellows 43. When the sensing bellows 39 is compressed and the pressure increases inside the bellows, the pressure is relieved by the flow of the air through the brake actuator air line 42 into the brake bellows 43. When the brake bellows 43 expands due to the increased volume of air inside the bellows, the bellows applies an upward force to the piston on the brake plunger 33. This upward force releases the brake by retracting the plunger 33 from the brake gear wheel 34. The brake spring 36 forces the plunger 33 down into the teeth of the brake gear wheel 34 when the brake is engaged. The brake spring 36 is compressed by the upward force of the piston on the plunger 33 when the brake bellows 43 expands in response to the air from the sensing bellows 39. In this manner, the activation of the mechanical clamp 13 automatically disengages the brake on the wheel 35.

Various modifications may be made of the invention without departing from the scope thereof and it is desired, therefore, that only such limitations shall be placed thereon as are imposed by the prior art and which are set forth in the appended claims.

What is claimed is:

1. A clamping infant carrier support frame for holding infant carriers of various sizes, the clamping infant carrier support frame being a fixed part of a stroller, the stroller having a frame and a plurality of wheels attached to the frame, the clamping infant carrier support frame comprising:

a clamping support frame having an inner surface and an outer surface, the support frame having an opening therethrough, a clamp body having a first end and a second end, the first end having an opening which extends longitudinally to the second end, the clamp body positioned in the opening in the clamping support frame and engaging with the inner surface of the clamping support frame, actuator means for actuating a clamp on the infant carrier, the actuator means located inside the clamp body, and a clamp disk having a front side and a back side, the front side having grips and the back side being juxtaposed with the actuator means.

2. A clamping infant carrier support frame as in claim 1, wherein the actuator means comprises a cylindrical clamp screw.

3. A clamping infant carrier support frame as in claim 1, wherein the actuator means comprises a cam operator attached to an actuator stem.

4. A clamping infant carrier support frame as in claim 1, further comprising the inner surface of the clamping support frame being tapped, the clamp body having an outer surface, the outer surface having a screw thread, the screw thread engaging with the inner surface of the clamping support frame when the clamp body is adjustably positioned in the clamping support frame.

5. A clamping infant carrier support frame as in claim 4, further comprising a locking nut positioned on the outer surface of the clamp body in juxtaposition with the clamping support frame.

6. A clamping infant carrier support frame for holding infant carriers of various sizes, the clamping infant carrier support frame being a fixed part of a stroller, the stroller having a frame and a plurality of wheels attached to the frame, the clamping infant carrier support frame comprising:

a clamping support frame having an inner surface and an outer surface, the support frame having an opening therethrough, a clamp body having a first end, a second end and an outer surface, the first end having an opening which extends longitudinally to the second end, the clamp body fitting in the opening in the clamping support frame and the outer surface of the clamp body engaging with the inner surface of the clamping support frame, actuator means for actuating a clamp on the infant carrier, the actuator means located inside the clamp body, a clamp disk having a front side and a back side, the front side having grips; and an actuator rod having a first end and a second end, the first end juxtaposed with the actuator means and the second end attached to the back side of the clamp disk.

7. A clamping infant carrier support frame as in claim 6, further comprising the opening in the clamping support frame being round.

8. A clamping infant carrier support frame as in claim 7, further comprising the clamp body being cylindrical in shape.

9. A clamping infant carrier support frame as in claim 8, further comprising:

the clamp body having a counterbore at the second end, the actuator rod having a piston, the piston sized to fit inside the counterbore, a retaining nut engaged to the outer surface of the clamp body at the second end, and a return spring sized to fit the counterbore and having a first end and a second end, the first end juxtaposed with the piston on the actuator rod and the second end juxtaposed with the retaining nut.

10. A clamping infant carrier support frame as in claim 6, further comprising the actuator means being fixedly connected to the actuator rod.

11. A clamping infant carrier support frame as in claim 10, further comprising:

the clamp body having a counterbore at the second end, the counterbore having a closed end where the counterbore stops extending into the clamp body, the actuator rod having a piston, the piston sized to fit inside the counterbore, a retaining nut engaged to the outer surface of the clamp body at the second end, and a clamp spring sized to fit the counterbore, the clamp spring having a first end and a second end, the first end juxtaposed with the piston on the actuator rod and the second end juxtaposed with the closed end of the counterbore.

12. A clamping infant carrier support frame as in claim 6, further comprising:

the actuator means having an opening, the opening extending longitudinally, a sensing spring having a first end and a second end, the first end juxtaposed with the actuator means and the second end juxtaposed with the actuator rod, a brake attached to the wheel of the stroller, and a position sensor having a proximal end and a distal end, the proximal end is attached to the sensing spring and the distal end is attached to the brake, the position sensor being slidably engaged inside the opening in the actuator means in response to the sensing spring being compressed.

13. A clamping infant carrier support frame as in claim 12, further comprising a brake cable having a proximal and a distal end, the proximal end is attached to the actuator means at the opening and the distal end is attached to the brake, the brake cable enclosing the position sensor.

14. A clamping infant carrier support frame as in claim 13, further comprising the brake having a brake actuator, the brake actuator having an input and an output, the brake actuator being connected to the brake cable at the input and being connected to a brake plunger at the output.

15. A clamping infant carrier support frame as in claim 14, further comprising a brake gear wheel attached to one of the wheels on the stroller, the brake gear wheel having teeth, the teeth being sized to engage with the brake plunger.

16. A clamping infant carrier support frame as in claim 6, further comprising:

the clamp disk further comprising an inner actuator disk and an outer actuator disk, the outer actuator disk located at the front side of the clamp disk and the inner actuator disk located at the back side of the clamp disk, a sensing bellows located between the inner actuator disk and the outer actuator disk, the sensing bellows having an outlet for the release of air, a brake actuator air line attached to the outlet on the sensing bellows, and a brake attached to the stroller wheels.

17. A clamping infant carrier support frame as in claim 16, further comprising the brake having a brake actuator, the brake actuator having an input and an output, the brake actuator being connected to the brake actuator air line at the input and being connected to a brake plunger at the output.

18. A clamping infant carrier support frame as in claim 17, further comprising a brake gear wheel attached to one of the wheels on the stroller, the brake gear wheel having teeth, the teeth being sized to engage with the brake plunger.

19. A clamping infant carrier support frame as in claim 15, further comprising:

the brake actuator further comprising, the brake actuator having a cylindrical body, a brake pin located at the input of the brake actuator, the brake pin being attached to the position sensor, a plunger lever having a first end and a second end, the first end attached to the position sensor and the second end attached to the brake plunger, the brake plunger having a piston, and a brake spring positioned inside the body of the brake actuator, the brake spring juxtaposed with the piston on the brake plunger.

20. A clamping infant carrier support frame as in claim 18, further comprising:

the brake actuator further comprising, the brake actuator having a cylindrical body, a brake bellows located at the input of the brake actuator, the brake bellows being attached to the brake actuator air line and being juxtaposed with the brake plunger, the brake plunger having a piston, and a brake spring positioned inside the body of the brake actuator, the brake spring juxtaposed with the piston on the brake plunger.

* * * * *